(12) United States Patent
Yamamoto

(10) Patent No.: US 6,614,367 B2
(45) Date of Patent: Sep. 2, 2003

(54) DATA RECORDING METHOD

(75) Inventor: Hiroshi Yamamoto, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 10/097,124

(22) Filed: Mar. 13, 2002

(65) Prior Publication Data
US 2002/0130793 A1 Sep. 19, 2002

(30) Foreign Application Priority Data
Mar. 19, 2001 (JP) ........................................ 2001-077704
Jan. 17, 2002 (JP) ........................................ 2002-008482

(51) Int. Cl.[7] .............................................. H03M 7/00
(52) U.S. Cl. ........................................... 341/50; 380/28
(58) Field of Search .............................. 341/50, 51, 52; 380/28

(56) References Cited

U.S. PATENT DOCUMENTS

| 4,942,487 A | * | 7/1990 | Noguchi et al. ......... 360/77.13 |
| 5,315,446 A | * | 5/1994 | Niki et al. ................... 360/32 |
| 5,354,135 A | * | 10/1994 | Sakagami et al. ............. 347/5 |
| 5,473,614 A | * | 12/1995 | Hayashi ....................... 360/48 |
| 5,699,442 A | * | 12/1997 | Yagi et al. ................... 348/169 |
| 6,038,536 A | * | 3/2000 | Haroun et al. ............... 704/229 |
| 6,040,862 A | * | 3/2000 | Asai et al. ............. 375/240.12 |
| 2002/0064277 A1 | * | 5/2002 | Kuribayaski et al. ......... 380/28 |

* cited by examiner

Primary Examiner—Peguy JeanPierre
(74) Attorney, Agent, or Firm—Katten Muchin Zavis Rosenman

(57) ABSTRACT

A data recording apparatus reverses the bit order of each of n-bit codes assigned respectively to $2^n$ frame data in the order of a normal-speed play, rearranges the frame data based on the reversed n-bit codes, and then records the rearranged frame data in that order onto a recording medium. A data reproducing apparatus reads out, from the recording medium, frame data corresponding in number to the reciprocal of the multiple in an aimed play speed and stored the read-out frame data in a buffer memory or the like. The data reproducing apparatus then reads out the stored frame data from the buffer memory or the like in a predetermined order in accordance with the aimed play speed. The data reproducing apparatus can realize such a high-speed play as were more than its data read performance. Besides, wasteful operations in a high-speed play can be eliminated and the load on the reading head unit of the data reproducing apparatus can be relieved.

11 Claims, 5 Drawing Sheets

FIG. 1

| 0×00 | 0×01 | 0×02 | 0×03 | 0×04 | 0×05 | 0×06 | 0×07 | ... |

REPRODUCE above: 0×01, 0×03, 0×05, 0×07
REPRODUCE below: 0×00, 0×02, 0×04, 0×06

FIG. 2

| 0×00 | 0×01 | 0×02 | 0×03 | 0×04 | 0×05 | 0×06 | 0×07 | ... |

SKIP above: 0×01, 0×03, 0×05, 0×07
REPRODUCE below: 0×00, 0×02, 0×04, 0×06

FIG. 3

| 0×00 | 0×04 | 0×02 | 0×06 | 0×01 | 0×05 | 0×03 | 0×07 | ... |

FIG. 4

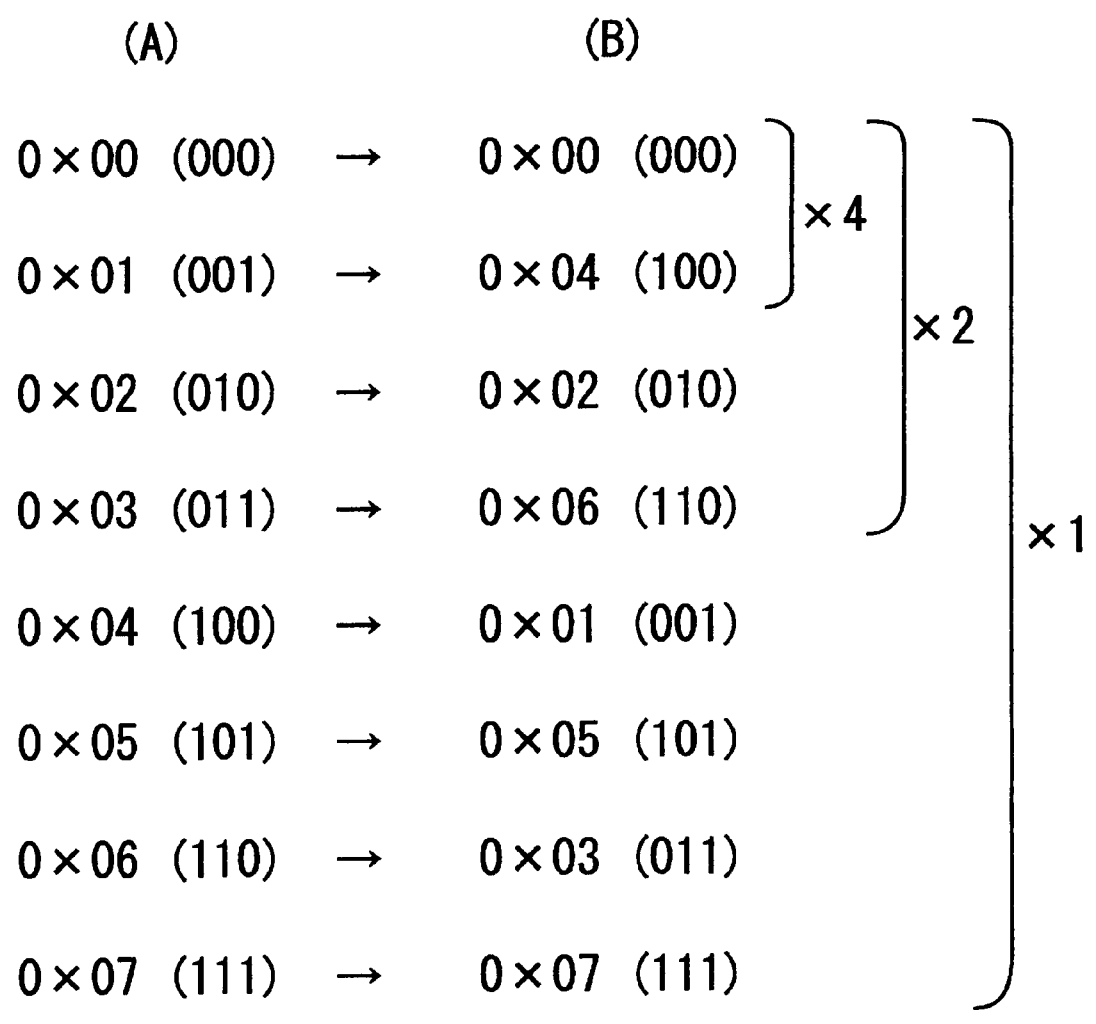

| (A) | | (B) | |
|---|---|---|---|
| 0×00 (000) | → | 0×00 (000) | |
| 0×01 (001) | → | 0×04 (100) | |
| 0×02 (010) | → | 0×02 (010) | |
| 0×03 (011) | → | 0×06 (110) | |
| 0×04 (100) | → | 0×01 (001) | |
| 0×05 (101) | → | 0×05 (101) | |
| 0×06 (110) | → | 0×03 (011) | |
| 0×07 (111) | → | 0×07 (111) | |

| (A) | | (B) |
|---|---|---|
| 0×00 (00000) | → | 0×00 (00000) |
| 0×01 (00001) | → | 0×16 (10000) |
| 0×02 (00010) | → | 0×08 (01000) |
| 0×03 (00011) | → | 0×24 (11000) |
| 0×04 (00100) | → | 0×04 (00100) |
| 0×05 (00101) | → | 0×20 (10100) |
| 0×06 (00110) | → | 0×12 (01100) |
| 0×07 (00111) | → | 0×28 (11100) |
| 0×08 (01000) | → | 0×02 (00010) |
| 0×09 (01001) | → | 0×18 (10010) |
| 0×10 (01010) | → | 0×10 (01010) |
| 0×11 (01011) | → | 0×26 (11010) |
| 0×12 (01100) | → | 0×06 (00110) |
| 0×13 (01101) | → | 0×22 (10110) |
| 0×14 (01110) | → | 0×14 (01110) |
| 0×15 (01111) | → | 0×30 (11110) |
| 0×16 (10000) | → | 0×01 (00001) |
| 0×17 (10001) | → | 0×17 (10001) |
| 0×18 (10010) | → | 0×09 (01001) |
| 0×19 (10011) | → | 0×25 (11001) |
| 0×20 (10100) | → | 0×05 (00101) |
| 0×21 (10101) | → | 0×21 (10101) |
| 0×22 (10110) | → | 0×13 (01101) |
| 0×23 (10111) | → | 0×29 (11101) |
| 0×24 (11000) | → | 0×03 (00011) |
| 0×25 (11001) | → | 0×19 (10011) |
| 0×26 (11010) | → | 0×11 (01011) |
| 0×27 (11011) | → | 0×27 (11011) |
| 0×28 (11100) | → | 0×07 (00111) |
| 0×29 (11101) | → | 0×23 (10111) |
| 0×30 (11110) | → | 0×15 (01111) |
| 0×31 (11111) | → | 0×31 (11111) |

×16, ×8, ×4, ×2, ×1

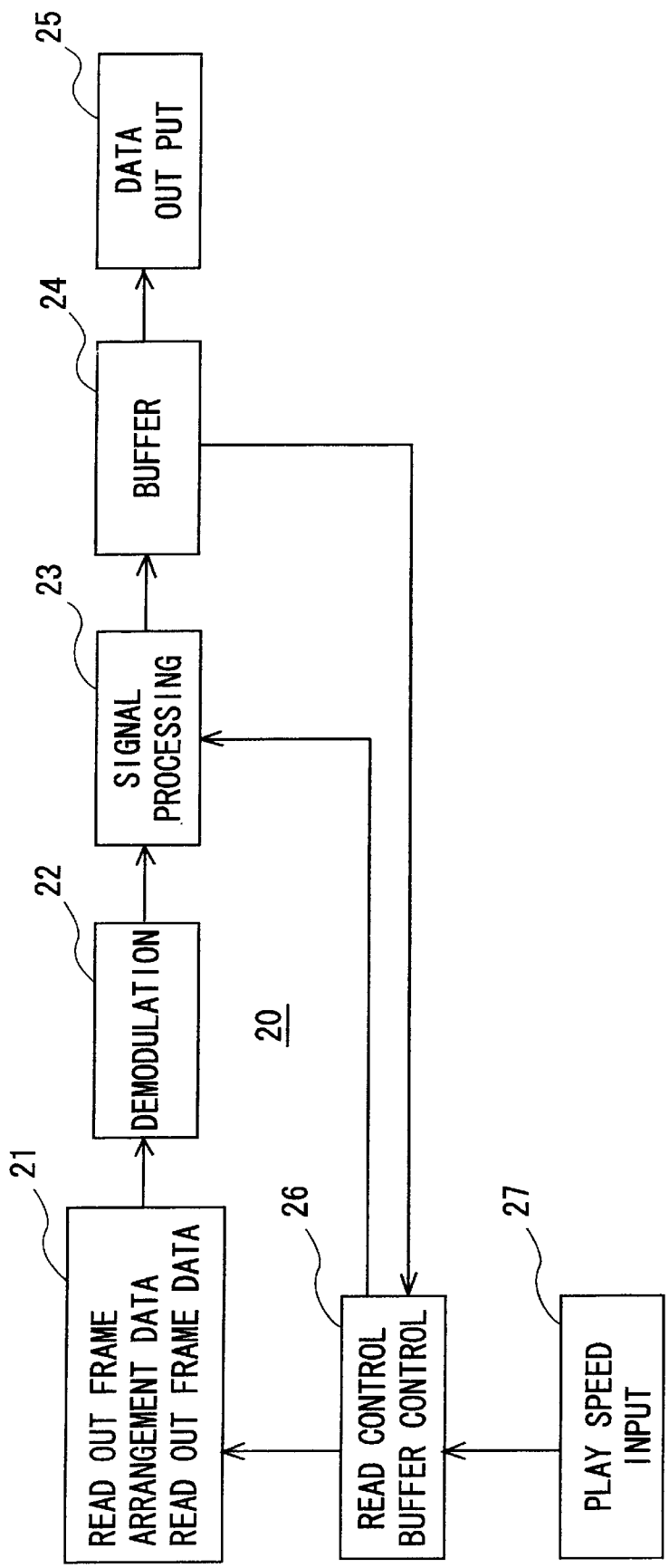

DATA RECORDING METHOD

This application is related to Japanese Patent Application No. 2001-077704 filed on Mar. 19, 2001, and No. 2002-008482 filed on Jan. 17, 2002, based on which this application claims priority under the Paris Convention and the contents of which are incorporated herein by reference.

BACKGROUND OF THE INVENTION

1. Field of the Invention

The present invention relates to data recording methods and apparatus for recording frame data according to motion JPEG or the like onto a recording medium, data reproducing methods and apparatus for reproducing the frame data from the recording medium, and recording media recording thereon frame data according to motion JPEG or the like.

2. Description of the Related Art

In various standards for static images, JPEG (Joint Photographic Coding Experts Group) is widely used in particular. JPEG is a standard for compression and expansion of color static images, regulated by ITU-TS (International Telecommunication Union-Telecommunication Standardization Sector; formerly the CCITT) and ISO (International Organization for Standardization).

On the other hand, as standards for dynamic images known are MPEG (Moving Picture Image Coding Experts Group), motion JPEG, and so on.

Motion JPEG is a standard in which the technique of JPEG is applied to dynamic images. In motion JPEG, data of each frame of a dynamic image is provided according to JPEG. A data reproducing apparatus rapidly expands the data of the frames in series to realize a dynamic image display.

More specifically, a recording medium records thereon data of static images of frames that constitute a dynamic image, for example, as illustrated in FIG. 1, the frame data indicated by "0x00", "0x01", "0x02", "0x03", "0x04", . . . , being recorded in this order. The data reproducing apparatus reproduces the static images in order as streaming data from the recording medium to realize a dynamic image display. FIG. 1 illustrates a case of a normal-speed play.

In motion JPEG, each frame is constituted by entire data of a static image, differently from MPEG in which only information on difference between frames is used. Therefore, editing at an arbitrary part, a reverse play, a multiple-speed play, etc., can be realized in simple manners.

In the case of reproducing a dynamic image from a recording medium such as an optical disk on which frame data according to motion JPEG are recorded, a special reproduction method, e.g., the below-described first or second reproduction method, is required for realizing a double-speed play, a quadruple-speed play, or the like, (hereinafter referred to as a high-speed play). The case of a double-speed play of an optical disk will be described below by way of example.

In the first reproduction method, frame data recorded on an optical disk according to the order of "0x00", "0x01", "0x02", "0x03", "0x04", . . . "0x07", as illustrated in FIG. 1, are read out in order and then stored in a buffer memory or the like. After this, only data of even frames ("0x00", "0x02", "0x04", "0x06", . . . ) of the stored frame data are read out to be expanded.

In the second reproduction method, when frame data are read out from the optical disk on which the frame data is recorded according to the order of "0x00", "0x01", "0x02", "0x03", "0x04", . . . "0x07", only data of even frames ("0x00", "0x02", "0x04", "0x06", . . . ) are read out with skipping data of odd frames ("0x01", "0x03", "0x05", "0x07", . . . ), as illustrated in FIG. 2, and then the read-out data of even frames are expanded.

In the case of the first reproduction method, however, the data reproducing apparatus, i.e., an optical disk player, can not realize any high play speed more than its data read performance. Any optical disk player has a limit of its data read performance (data read speed). The play speed is restricted by the limit of the data read performance of the optical disk player even if the player has its CPU capable of realizing a higher-speed play.

In case of the second reproduction method, when the optical disk player reads out data from an optical disk, the data skipping operation and the data read operation must frequently be switched over from one to the other. Such frequent switchover operations require excessive time and may cause a bottleneck on the high-speed play. In particular, the frequent switchover operations may cause an excessive load on the reading head unit (an optical pickup) of the optical disk player. The higher the play speed is, the more rapidly the optical disk player must perform the switchover operations. This makes the optical disk player difficult to realize the higher-speed play.

SUMMARY OF THE INVENTION

An object of the present invention is to provide data recording methods and apparatus, data reproducing methods and apparatus, and recording media, all of which are capable of realizing such a high-speed play as were more than the data read performance of the data reproducing apparatus, and realizing a high-speed play with eliminating wasteful operations and relieving the load on the reading head unit of the data reproducing apparatus.

According to an aspect of the present invention, n-bit codes are assigned respectively to $2^n$ frame data in the order of a normal-speed play, the bit order of each of the n-bit codes is reversed, a recording order of the frame data is defined based on the reversed n-bit codes, and then the frame data are recorded in the defined recording order onto a recording medium. According to another aspect of the present invention, when frame data are reproduced from the recording medium, frame data corresponding in number to the reciprocal of the multiple in a desired play speed are read out in order from the recording medium, the read-out frame data are stored in a buffer memory or the like, and then the stored frame data are read out from the buffer memory or the like in a predetermined order in accordance with the desired play speed.

In the present invention, the recording order of the frame data on the recording medium is devised so that all the frame data need not be read out in a high-speed play of the recording medium and only the necessary frame data can be reproduced even without frequent skip operations upon reproduction.

In this manner, a data reproducing apparatus can realize such a high-speed play as were more than its data read performance, wasteful operations in a high-speed play can be eliminated, and the load on the reading head unit of the data reproducing apparatus can be relieved.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing the invention in practice.

BRIEF DESCRIPTION OF THE DRAWINGS

FIG. 1 illustrates the order of frames being reproduced to realize a dynamic image display according to the first conventional reproduction method;

FIG. 2 illustrates the order of frames being reproduced to realize a dynamic image display according to the second conventional reproduction method;

FIG. 3 illustrates an example of frame data arrangement recorded on an optical disk when a unit of frames for rearrangement is constituted by eight frames, according to the present invention;

FIG. 4 illustrates a manner of rearrangement of frames to be read out according to play speed when a unit of frames for rearrangement is constituted by eight frames, according to the present invention;

FIG. 5 illustrates a manner of rearrangement of frames to be read out according to play speed when a unit of frames for rearrangement is constituted by 32 frames, according to the present invention;

FIG. 7 is a block diagram illustrating schematic configuration of a data reproducing apparatus for reproducing the rearranged frame data from the optical disk, according to the present invention.

DETAILED DESCRIPTION OF THE PREFERRED EMBODIMENTS

Figure 6:
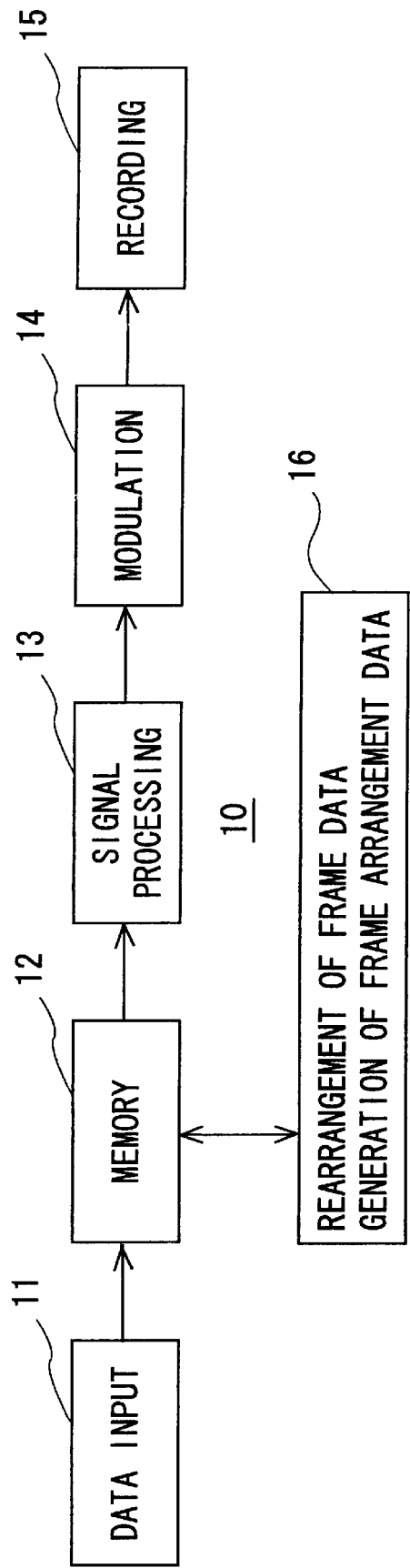
FIG. 6 is a block diagram illustrating schematic configuration of a data recording apparatus for rearranging frame data and recording the rearranged frame data onto an optical disk, according to the present invention.

Hereinafter, embodiments of the present invention will be described with reference to drawings.

Data Arrangement for Recording and Reproduction

Referring to FIG. 3, a data recording apparatus records eight ($=2^3$) frame data of "0x00" to "0x07" onto an optical disk in the order of "0x00", "0x04", "0x02", "0x06", "0x01", "0x05", "0x03", and "0x07".

As shown in (A) of FIG. 4, in the case where the eight frame data of "0x00" to "0x07" are assigned 3-bit codes "000", "001", "010", "011", "100", "101", "110", and "111", respectively, the data recording apparatus reverses the bit order of each 3-bit code symmetrically with its central bit (the second bit in this example). The data recording apparatus then records the frame data corresponding to the respective reversed 3-bit codes "000", "100", "010", "110", "001", "101", "011", and "111", onto the optical disk in that order.

In the case of a quadruple-speed play of the optical disk on which frame data are recorded in the order illustrated in FIGS. 3 and 4, the data reproducing apparatus reads out only ¼ (two frame data in this example) from the head of the eight frame data recorded on the optical disk, and stores them in a buffer memory or the like. That is, the data reproducing apparatus reads out two frame data of "0x00" and "0x04" from the optical disk, as shown in (B) of FIG. 4, and stores them in the buffer memory or the like. The data reproducing apparatus then reads out the frame data from the buffer memory or the like in the order of "0x00" and "0x04". The data reproducing apparatus thus obtains the frame data necessary for the quadruple-speed play.

In the case of a double-speed play of the optical disk, the data reproducing apparatus reads out only ½ (four frame data in this example) from the head of the eight frame data recorded on the optical disk, and stores them in the buffer memory or the like. That is, the data reproducing apparatus reads out four frame data of "0x00", "0x04", "0x02", and "0x06" from the optical disk, as shown in (B) of FIG. 4, and stores them in the buffer memory or the like. The data reproducing apparatus then reads out the frame data from the buffer memory or the like in the order of "0x00", "0x02", "0x04", and "0x06". The data reproducing apparatus thus obtains the frame data necessary for the double-speed play.

In the case of a normal-speed play of the optical disk, the data reproducing apparatus reads out all the eight frame data of "0x00" to "0x07" in the recording order on the optical disk, as shown in (B) of FIG. 4, and stores them in the buffer memory or the like. The data reproducing apparatus then reads out the frame data from the buffer memory or the like in the order of "0x00", "0x01", "0x02", "0x03", "0x04", "0x05", "0x06", and "0x07". Further, in the case of an eight-fold-speed play of the optical disk, the data reproducing apparatus reads out only the frame data of "0x00" at the head of the eight frame data shown in (B) of FIG. 4, and stores it in the buffer memory or the like. The data reproducing apparatus then reads out the frame data of "0x00" from the buffer memory or the like.

In the embodiment illustrated in FIGS. 3 and 4, a unit of frames for rearrangement is constituted by eight ($2^3$) frames.

FIG. 5 illustrates another embodiment in which a unit of frames for rearrangement is constituted by 32 ($2^5$) frames.

In the case where a unit of frames for rearrangement is constituted by 32 frames, as shown in (A) of FIG. 5, the 32 frame data of "0x00" to "0x31" are assigned 5-bit codes "00000" to "11111", respectively. The data recording apparatus reverses the bit order of each 5-bit code symmetrically with its central bit (the third bit in this example). The data recording apparatus then records the frame data corresponding to the respective reversed 5-bit codes "00000", "10000", "01000", . . . , "10111", "01111", and "11111", onto an optical disk in that order. Thus, the frame data of "0x00", "0x16", "0x08", . . . , "0x23", "0x15", and "0x31", are recorded on the optical disk in this order.

In this case where a unit of frames for rearrangement is constituted by 32 ($2^5$) frames, the data reproducing apparatus can realize from a normal-speed play to a $2^5$ (32)-fold-speed play. More specifically, in the case of a 16-fold-speed play, the data reproducing apparatus reads out 1/16 (i.e., two frame data) from the head of the 32 frame data recorded on the optical disk. That is, the data reproducing apparatus reads out frame data of "0x00" and "0x16" in this order from the optical disk, and stores them in the buffer memory or the like. The data reproducing apparatus then reads out the frame data from the buffer memory or the like in the order of "0x00" and "0x16". The data reproducing apparatus thus obtains the frame data necessary for the 16-fold-speed play.

In the case of an eight-fold-speed play, the data reproducing apparatus reads out ⅛ (i.e., four frame data) from the head of the 32 frame data recorded on the optical disk. That is, the data reproducing apparatus reads out frame data of "0x00", "0x16", "0x08", and "0x24" in this order from the optical disk, and stores them in the buffer memory or the like. The data reproducing apparatus then reads out the frame data from the buffer memory or the like in the order of "0x00", "0x08", "0x16", and "0x24". The data reproducing apparatus thus obtains the frame data necessary for the eight-fold-speed play.

Although the description is omitted, the data reproducing apparatus can realize a quadruple-speed play, a double-speed play, a normal-speed play, and a 32-fold-speed play in similar manners.

As described above, the data recording apparatus reverses the bit order of each of n-bit codes that have been assigned respectively to $2^n$ frame data. The data recording apparatus then records the frame data corresponding to the respective reversed n-bit codes onto an optical disk in the order of the reversed n-bit codes. The data reproducing apparatus realizes a high-speed play as follows. That is, the data reproducing apparatus reads out, from the optical disk, frame data corresponding in number to the reciprocal of the multiple in speed of the high-speed play, in the recording order, and stores the read-out frame data in a buffer memory or the like. The data reproducing apparatus then reads out the frame data from the buffer memory or the like in an order predetermined in accordance with the play speed.

In this case, the optical disk records thereon the frame data in the order of the reversed n-bit codes. Thus, in a high-speed play, the data reproducing apparatus may read out only frame data corresponding in number to the reciprocal of the multiple in speed of the high-speed play. Therefore, the data read performance (data read speed) of the data reproducing apparatus may suffice if it can read out only frame data corresponding in number to the reciprocal of the multiple in speed of the high-speed play. This means that such a high-speed play as were more than the actual data read performance of the data reproducing apparatus can be realized. Besides, the frame data necessary for any high-speed play are recorded in succession on the optical disk. Therefore, the data reproducing apparatus can realize any high-speed play with a less number of skip operations than the prior art. This can reduce the wastefulness in operation and so relieve the load on the reading head unit of the data reproducing apparatus.

If the data reproducing apparatus has a margin in its data read performance, it may read out the number of frame data more than the reciprocal of the multiple in speed of a high-speed play. Besides, even when the data reproducing apparatus cannot afford to realize a high-speed play because of its data read performance, by reading out the number of frame data in accordance with its data read performance from the optical disk, the data reproducing apparatus can realize the high-speed play with images of some quality though skipping the necessary frames to some extent is unavoidable.

Configuration of Data Recording Apparatus

FIG. 6 illustrates functional components of a data recording apparatus 10 for rearranging frame data and recording the rearranged frame data onto an optical disk, as described above.

Referring to FIG. 6, a data input unit 11 takes in frame data in the order of a normal-speed play, the order being shown in FIG. 1. Frame data to be input through the data input unit 11 are according to, e.g., motion JPEG. The frame data according to motion JPEG may be taken at need out of frame data provided in advance within a database.

A control unit 16 stores, in a memory 12, the frame data input through the data input unit 11 in the order of a normal-speed play. The memory 12 must have its capacity sufficient for storing data of a unit of frames for rearrangement. More specifically, in the case that a unit of frames for rearrangement is constituted by eight frames as in the embodiment of FIGS. 3 and 4, the memory 12 must have its capacity sufficient for storing eight frame data. Also, in the case that a unit of frames for rearrangement is constituted by 32 frames as in the embodiment of FIG. 5, the memory 12 must have its capacity sufficient for storing 32 frame data.

The control unit 16 controls addresses in the memory 12 so that frame data may be read out from the memory 12 in an order after rearrangement. More specifically, in the case that a unit of frames for rearrangement is constituted by eight frames, the control unit 16 controls the memory 12 so that frame data may be read out from the memory 12 in the order after the rearrangement illustrated in FIGS. 3 and 4. Also, in the case that a unit of frames for rearrangement is constituted by 32 frames, the control unit 16 controls the memory 12 so that frame data may be read out from the memory 12 in the order after the rearrangement illustrated in FIG. 5.

The frame data read out from the memory 12 are sent to a signal processing unit 13. The signal processing unit 13 generates an error correction code for each frame data and adds it to the frame data. The signal processing unit 13 thereby encodes the frame data and then sends the encoded frame data to a modulation unit 14.

The modulation unit 14 generates a signal (hereinafter referred to as frame signal) in which a predetermined carrier signal has been modulated based on the encoded frame data. The modulation unit 14 then sends the frame signal to a recording unit 15.

The recording unit 15 is provided with an optical recording head. The recording unit 15 drives the optical recording head based on the frame signal to record frame data onto an optical disk. The optical disk may be a master disk to be used for making one or more duplicate optical disks.

Besides, the control unit 16 generates frame arrangement data. The frame arrangement data is data necessary for reading out frame data from an optical disk in accordance with a play speed. The control unit 16 sends the frame arrangement data to the signal processing unit 13 through the memory 12. In another example, the control unit 16 may send the frame arrangement data directly to the signal processing unit 13 not through the memory 12.

The signal processing unit 13 generates an error correction code for the frame arrangement data and adds it to the frame arrangement data. The signal processing unit 13 thereby encodes the frame arrangement data and then sends it to the modulation unit 14. The modulation unit 14 generates a signal (hereinafter simply referred to as arrangement signal) in which a predetermined carrier signal has been modulated based on the encoded frame arrangement data. The modulation unit 14 then sends the arrangement signal to the recording unit 15. The recording unit 15 drives the optical recording head based on the arrangement signal to record the frame arrangement data in a predetermined recording area of the optical disk on which the frame data are recorded or to be recorded as described above. The frame arrangement data may be recorded in a TOC (Table Of Contents) recording area of the optical disk as TOC data.

In the above-described manner, the data recording apparatus 10 with the above-described functional components records frame data onto an optical disk.

Configuration of Data Reproducing Apparatus

FIG. 7 illustrates functional components of a data reproducing apparatus 20 for reproducing frame data from an optical disk on which the frame data have been recorded in the above-described manner.

Referring to FIG. 7, a reading unit 21 is provided with an optical head for reading out an signal from an optical disk. The reading unit 21 sends the read-out signal to a demodulation unit 22.

The demodulation unit 22 demodulates the signal read out from the optical disk, to obtain a rectangular-wave signal. The rectangular-wave signal output from the demodulation 22 is sent to a signal processing unit 23.

The signal processing unit 23 converts the received rectangular-wave signal into binary data. The signal processing unit 23 performs error correction using the error correction code added to the binary data, and thereby decodes the data.

Before starting to read out frame data from the optical disk, the data reproducing apparatus reads out frame arrangement data from a predetermined recording area of the optical disk. More specifically, a control unit 26 controls the reading unit 21 to read out an signal from the predetermined recording area of the optical disk. The read-out signal is sent to the signal processing unit 23 through the demodulation unit 22. The signal processing unit 23 converts the output rectangular-wave signal from the demodulation unit 22 into binary data and then performs error correction. The signal processing unit 23 thereby decodes the frame arrangement data and then sends it to the control unit 26.

On the basis of the frame arrangement data, the control unit 26 can know the recording position of each frame data (i.e., the address of each frame data) on the optical disk, and the recording order of the frame data on the optical disk. For example, based on the frame arrangement data, the control unit 26 can know that the frame data have been rearranged as illustrated in FIG. 3 or shown in (B) of FIG. 4 or 5.

When a user of the data reproducing apparatus 20 inputs a desired play speed through an instruction input unit 27, the control unit 26 controls the operation of the reading unit 21 to read out frame data from the optical disk in accordance with the input play speed. More specifically, the control unit 26 controls the reading unit 21 to read out frame data corresponding in number to the reciprocal of the multiple in the input play speed, from the optical disk.

The signal read out from the optical disk by the reading unit 21 is sent to the signal processing unit 23 through the demodulation unit 22. The signal processing unit 23 converts the output rectangular-wave signal from the demodulation unit 22 into binary data and then performs error correction. The signal processing unit 23 thereby decodes the frame data read out from the optical disk, and then sends them to a buffer 24. The buffer 24 has its capacity sufficient for storing frame data corresponding in number to the reciprocal of the multiple in any play speed that the user may input.

The control unit 26 then controls the buffer 24 so that the frame data may be read out from the buffer 24 in a predetermined order in accordance with the input play speed, as shown in (B) of FIG. 4 or 5.

The frame data read out from the buffer 24 are sent to a data output unit 25. The data output unit 25 converts the frame data into a signal that meets the signal standard (a television standard such as NTSC) of an externally connected monitor device. The data output unit 25 then outputs the signal to the monitor device.

In the above-described manner, the data reproducing apparatus with the above-described functional components can realize the high-speed play, requested by the user, of the optical disk on which the rearranged frame data are recorded.

It is of course that the present invention is not limited to the above-described embodiments and various changes and modifications can be made without departing from the technical scope of the invention.

For example, recording media used in the present invention are not limited to optical disks. Magnetic disks such as hard disks, magnetic tapes, etc., can also be used. Besides, frame data to be recorded on a recording medium are not limited to those according to motion JPEG. The present invention is applicable to data according to any standard if the standard defines each frame data complete in itself.

Further, the present invention is applicable also to a system for transmitting and receiving frame data. In this case, a transmitter may transmit frame data, which have been rearranged as described above, in accordance with a play speed requested by a receiver. The receiver can realize a high-speed play even without receiving all frame data.

What is claimed is:

1. A Data recording method comprising the steps of:
   assigning n-bits codes respectively to $2^n$ frame data (where n is positive integer) in the order of a normal-speed play;

reversing the bit order of each of the n-bits codes;

defining a recording order of the frame data based on the reversed n-bit codes; and recording the frame data in the defined recording order onto a recording medium.

2. The method according to claim 1, wherein the $2^n$ frame data are motion JPEG data.

3. A data recording apparatus comprising:
   a frame rearranging unit, that rearranges $2^n$ frame data (where n is a positive integer) based on n-bit codes obtained by reversing the bit order of each of n-bit codes assigned respectively to the frame data in order of a normal-speed play; and a recording unit, that records the rearranged frame data in a rearranged order onto a recording medium.

4. The apparatus according to claim 3, wherein the $2^n$ frame data are motion JPEG data.

5. A data reproducing method comprising the steps of:
   reading out frame data corresponding in number to the reciprocal of the multiple in an aimed play speed, in the recording order from a recording medium on which $2^n$ frame data (where n is a positive integer) having been rearranged based on n-bit codes obtained by reversing the bit order of each of n-bit codes assigned respectively to the frame data in the order of a normal-speed play, are recorded in the order after the rearrangement;

storing the read-out frame data in a buffer; and reading out the stored frame data.

6. The method according to claim 5, wherein the $2^n$ frame data are motion JPEG data.

7. A data reproducing apparatus comprising:
   a reading-out unit, that reads out frame data corresponding in number to the reciprocal of the multiple in an aimed play speed, in the recording order from a recording medium on which $2^n$ frame data (where n is positive integer) having been rearranged based on n-bit codes obtained by reversing the bit order of each of n-bits codes assigned respectively to the frame data in the order of a normal-speed play, are recorded in the order after the rearrangement;

a memory unit, that stores the read-out frame data; and a memory reading-out unit, that reads out the stored frame data from the memory unit.

8. The apparatus according to claim 7, wherein the $2^n$ frame data are motion JPEG data.

9. A recording medium on which $2^n$ frame data (where n is a positive integer) having been rearranged based on n-bit codes obtained by reversing the bit order of each of n-bit codes assigned respectively to the frame data in the order of a normal-speed play are recorded in the order after the rearrangement.

10. The medium according to claim 9, wherein the $2^n$ frame data are motion JPEG data.

11. A method for recording and reproducing data from a file including a plurality of frame data sequentially ordered in the file, wherein fewer than all of the frame data are required for playback at a speed above normal-play speed, comprising the step of:
    recording the plurality of frame data to be played so that all of the frame data that are required for playback at the speed above normal-play speed are arranged at a frontward portion of the file.

* * * * *